Nov. 26, 1935.                J. B. BOYETT                2,022,584
                          MOBILE SPRAYING MACHINE
                          Filed May 8, 1935          4 Sheets-Sheet 1

Inventor
Jesse B. Boyett
By Geo. P. Kimmel
Attorney

Nov. 26, 1935.　　　J. B. BOYETT　　　2,022,584
MOBILE SPRAYING MACHINE
Filed May 8, 1935　　　4 Sheets-Sheet 2

Inventor
Jesse B. Boyett

Geo. P. Kimmel
Attorney

Nov. 26, 1935.   J. B. BOYETT   2,022,584
MOBILE SPRAYING MACHINE
Filed May 8, 1935   4 Sheets-Sheet 3

Inventor
Jesse B. Boyett

By Geo. P. Kimmel
Attorney

Patented Nov. 26, 1935

2,022,584

UNITED STATES PATENT OFFICE 2,022,584

MOBILE SPRAYING MACHINE

Jesse B. Boyett, Nashville, Ga.

Application May 8, 1935, Serial No. 20,475

17 Claims. (Cl. 299—42)

This invention relates to a mobile spraying machine designed primarily for use for the spraying of plants by any suitable solution for relieving plants of diseases and noxious insects and the like, but it is to be understood that the machine may be employed for any purpose for which it is found applicable.

One of the objects of the invention is to provide, in a manner as hereinafter set forth, a machine of the class referred to having as a part thereof a unitary structure provided with a tank constituting a reservoir for the spraying solution.

A further object of the invention is to provide, in a manner as hereinafter set forth, a machine of the class referred to including an expelling pump for the spraying solution, a plurality of solution agitators and an operating shaft common to said pump and agitators and driven from the traction wheels of the machine.

A further object of the invention is to provide, in a manner as hereinafter set forth, a machine for the purpose referred to including a bodily oscillatory self-centering pump structure of the reciprocatory type for expelling the spraying solution.

A further object of the invention is to provide, in a manner as hereinafter set forth, a machine for the purpose referred to including an expelling pump for the spraying solution having a valve controlled tubular plunger for controlling the discharge of spraying solution from the machine.

A further object of the invention is to provide, in a manner as hereinafter set forth, a machine for the purpose referred to having means for regulating the pressure of the solution as applied to the plants, and with said means acting as a conductor for returning the surplus solution from the spray lines to the machine.

A further object of the invention is to provide, in a manner as hereinafter set forth, a machine for the purpose referred to including a solution expelling pump having a reciprocatory plunger operated without the employment of connecting rods and with the pump so constructed, so arranged and so supported whereby side strain is completely eliminated on the plunger during the operation of the latter resulting in the life of the plunger being materially increased.

A further object of the invention is to provide, in a manner as hereinafter set forth, a machine for the purpose referred to including a pump structure having as a fixed part thereof a valve controlled rigid suction pipe depending and suspended from the pump body of said structure and in permanent communication with the pump plunger in a manner to prevent leakage.

A further object of the invention is to provide, in a manner as hereinafter set forth, a machine for the purposes referred to including a mobile unitary supporting structure having as a fixed part thereof a solution containing tank, a pump structure mounted on the said other structure and including an upwardly extending air chamber communicating with spray lines and with said tank through a rigid valve controlled suction pipe depending into the tank, and with said pump structure capable of being bodily removed from the said other structure when occasion requires without waste.

A further object of the invention is to provide, in a manner as hereinafter set forth, a machine for the purpose referred to including a mobile unitary supporting structure having as a fixed part thereof a solution containing tank, a solution expelling pump, agitators within the tank, operating means for the pump extending through the tank, operating means for the agitators depending into the tank, driving means for the operating means for the pump arranged below the bottom of the tank and driving means for the operating means for the agitators arranged over the top of the tank.

A further object of the invention is to provide, in a manner as hereinafter set forth, a machine for the purpose referred to including a horizontally disposed pump suspended at its ends upon universal joint connections having means to prevent the pump from rocking during the operation thereof.

A further object of the invention is to provide, in a manner as hereinafter set forth, a machine for the purpose referred to including a solution expelling pump suspended at one end upon a universal joint connection and at its other end upon a universal joint connection carried by the operating means for the plunger of the pump thereby eliminating the employment of connecting rods.

A further object of the invention is to provide, in a manner as hereinafter set forth, a machine for the purpose referred to including a mobile unitary supporting structure for a pump structure and having as a part thereof a fixed tank for the spraying solution, and a solution agitating structure depending into the tank having means positioned exteriorly of the tank for venting the latter to prevent the formation of a vacuum therein.

Further objects of the invention are to provide, in a manner as hereinafter set forth, a machine for the purpose referred to which is comparatively simple in its construction and arrangement, strong, durable, compact, thoroughly efficient in its use, readily assembled, conveniently repaired when occasion requires and comparatively inexpensive to set up.

With the foregoing objects and others which may hereinafter appear, the invention consists of such parts and such combination of parts as will be more specifically described and illustrated in the accompanying drawings, wherein is shown an embodiment of the invention, but it is to be understood that changes, variations and modifications may be resorted to which fall within the scope of the invention as claimed.

Figures 3, 4:
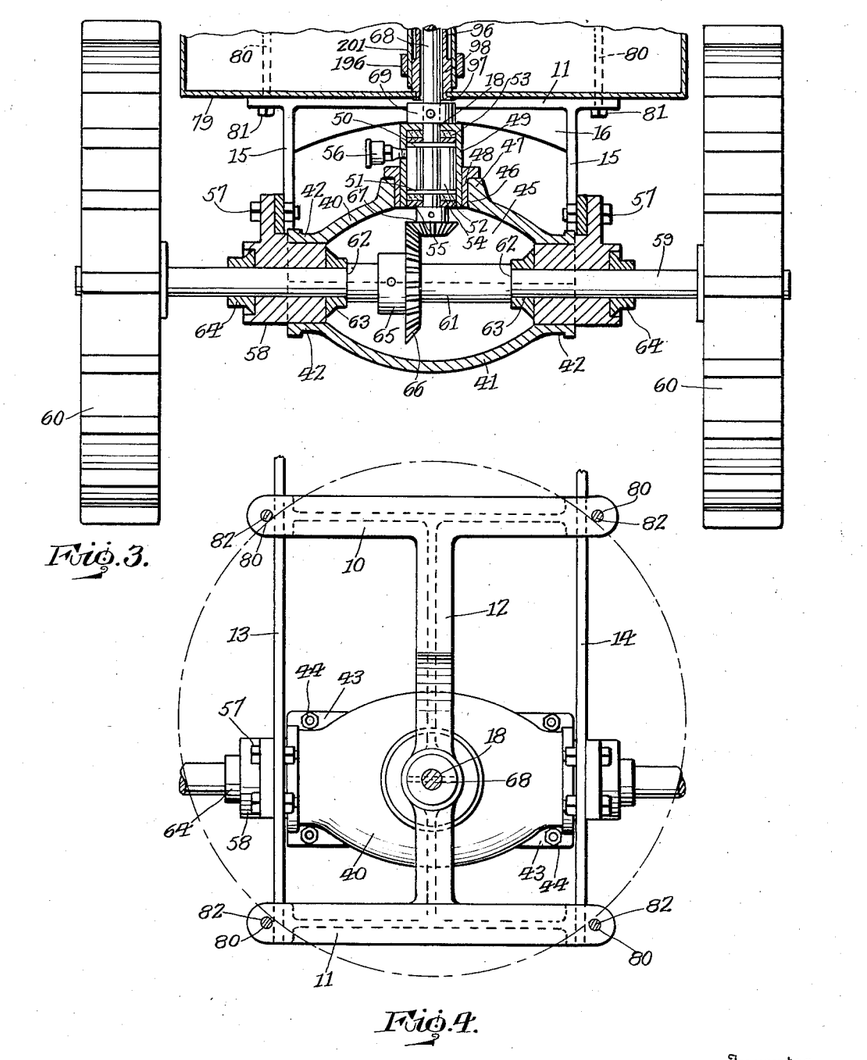
Figure 3 is a fragmentary view in vertical section.
Figure 4 is a fragmentary view in top plan.
Figures 5, 6:
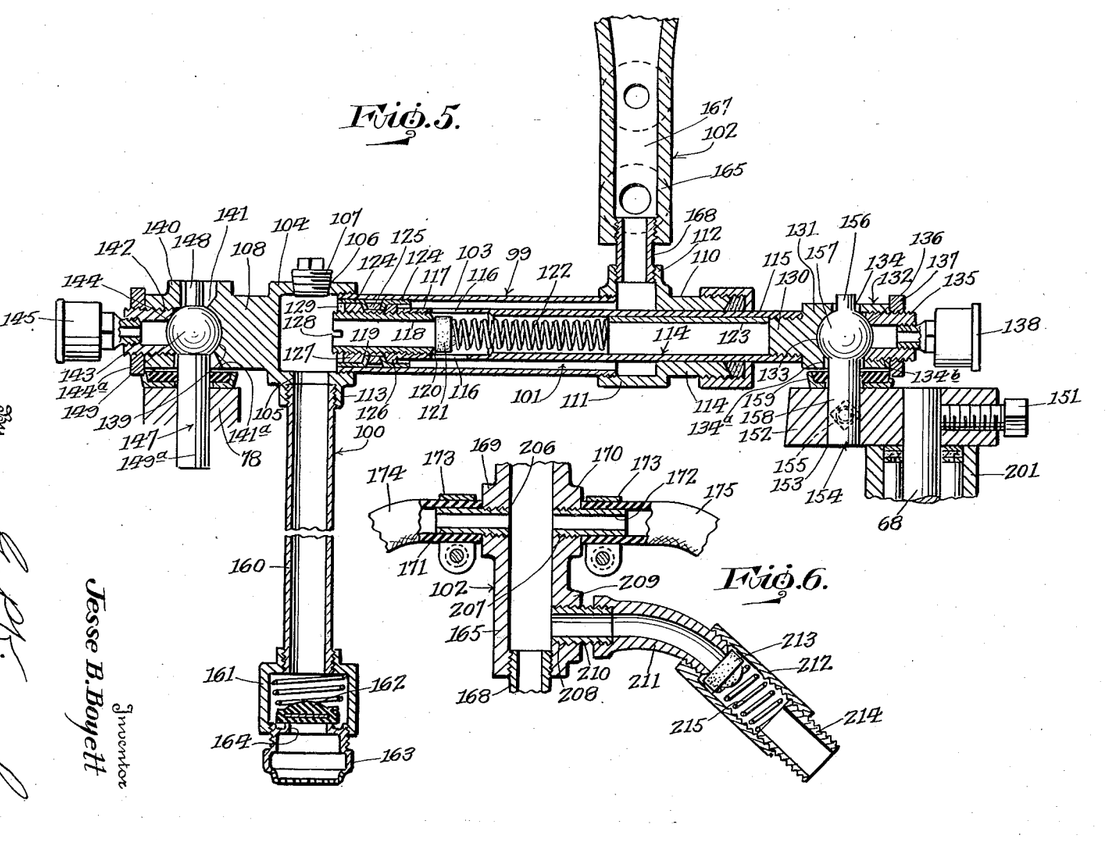
Figure 5 is a longitudinal sectional view of the pump structure.
Figure 6 is a vertical view of the relief means for regulating the application of the solution.

The machine includes (Figures 3 and 4) a bottom frame formed of a front bar 10, a rear bar 11, a central bar 12 and a pair of side bars 13, 14. The bars 10 and 11 are of like form and each, in proximity to its ends, is formed with a depending apertured arm 15. The arms 15 are connected together by a web 16. The central bar 12 is integral at its ends with the bars 10 and 11 and is formed centrally with a depending portion 17 provided with an opening 18. The rear ends of the side bars 13, 14 are secured, as at 19, to the depending arms 15 on the rear bar 11. The side bars 13, 14, intermediate their ends, are secured, as at 20, to the depending arms 15 on the front bar 10. The side bars 13, 14 (Figure 2) have oppositely disposed inwardly extending parts 21, 22 respectively which merge into the forward end parts 23, 24 respectively.

Figure 2:
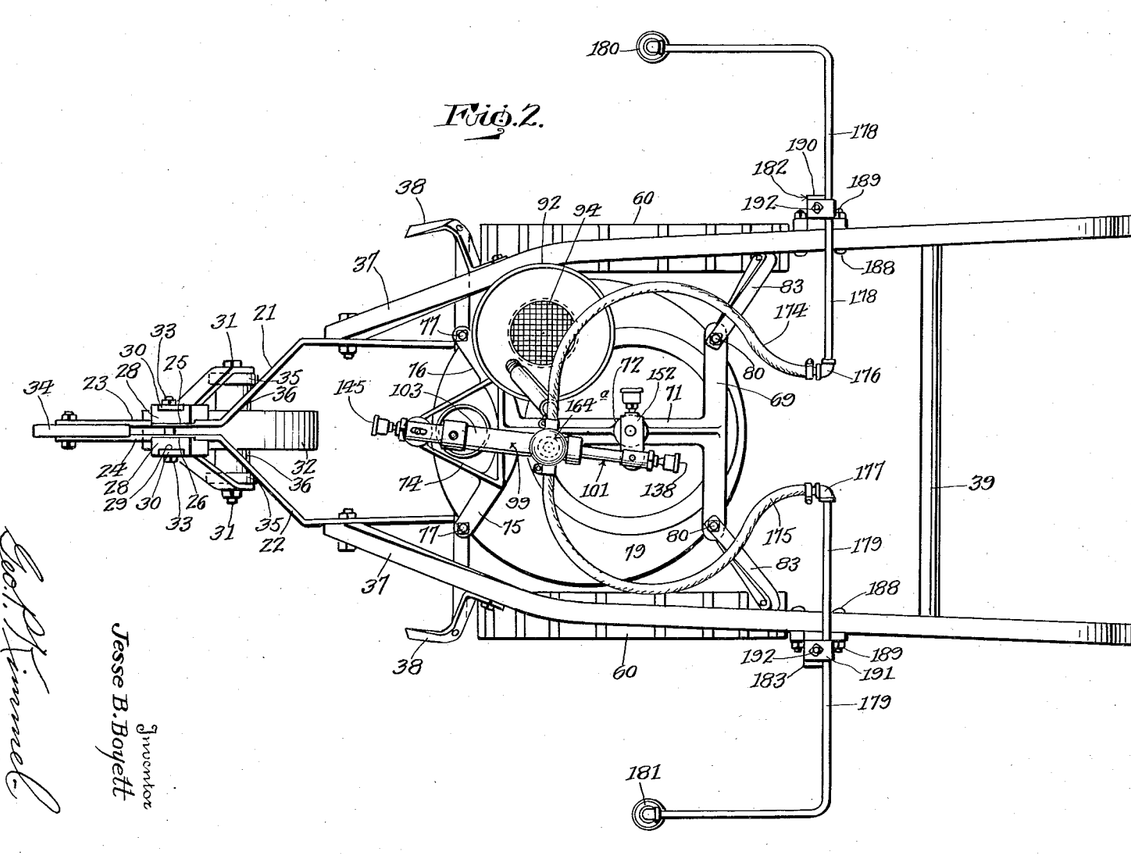
Figure 2 is a top plan view thereof.

The end parts 23, 24 have their outer faces formed with inclined grooves 25, 26 respectively in which are mounted blocks 27, 28 respectively having their outer faces grooved, as at 29. Mounted in the grooves of the said blocks are oppositely disposed depending hangers 30 carrying at their lower ends an axle 31. The blocks and hangers constitute brackets. Revolubly mounted on axle 31 between the brackets is a caster wheel 32. Holdfast means 33 is employed for anchoring the parts 23, 24, blocks and hangers together. Secured to the parts 23, 24 and extending forwardly therefrom is a clevis 34. Dust collars 35 are interposed between the ends of the hub 36 of wheel 32 and the hangers 30.

Secured to the sides 13, 14 are the lower ends of upstanding rearwardly inclined handle bars 37. Attached to and depending from the handle bars 37, as well as being braced from the side bars 13, 14 are depending leaf lifters 38. A brace member 39 is connected to and arranged between the upper portions of the handle bars 37.

Arranged below the bar 12 is a housing of substantial elliptical contour and formed of an upper and a lower section 40, 41 each provided at its ends with a semi-circular part 42. The parts 42 of section 40 are oppositely disposed with respect to the parts 42 of section 41. The parts 42 of section 40 coact with the parts 42 of section 41 to form the housing at each end with an annulus. The sections 40, 41 are formed with laterally extending apertured lugs 43 arranged in superimposed relation and through which extend holdfast means 44 for securing the sections 40, 41 in edgewise abutting engagement to form a chamber 45. The section 40 is provided centrally of its top with an opening 46 and an upstanding annular boss 47 having its inner edge forming a continuation of the edge of opening 46.

Seated upon boss 47 and depending therein, as well as extending into opening 46 is a flanged collar 48. The bar 12 of the bottom frame has a depending sleeve-like portion 49 which extends into collar 48 and communicates with opening 18. Arranged within the portion 49 are spaced apertured metallic discs 50, 51. Roller bearings 52 are arranged between the discs. Felt washers 53, 54 and a metallic washer 55 are positioned in the portion 49. The washer 53 is arranged between disc 50 and bar 12. The washer 54 is arranged between disc 51 and washer 55. The latter is fixedly secured within portion 49. Communicating with the interior of portion 49 is a lubricant cup 56.

Fixed, as at 57, to the side bars 13, 14, as well as suspended therefrom, are bearing members 58 for the axle 59 of a pair of traction wheels 60. The members 58 are arranged within and extend inwardly and outwardly with respect to the parts 42 of the housing section. The parts 42, in connection with the apertured lugs 43 and holdfast means 44, connect the members 58 to the housing.

The axle 59 has an enlarged central part 61 which provides a pair of spaced shoulders 62. Interposed between the shoulders 62 and the inner ends of members 59, as well as surrounding axle 59, are thrust collars 63. Positioned on axle 59 and bearing against the outer ends of members 59 are dust collars 64.

Fixed on the part 61 of axle 59 is the hub 65 of an upstanding beveled gear 66 which meshes with a beveled pinion 67 on the lower end of a pump structure operating shaft 68 which extends upwardly through the discs 50, 51, washers 53, 54 and 55 and is surrounded by the roller bearings 52. The shaft 68 extends through opening 18 and carries a stop collar 69 which abuts the central bar 12.

Figures 1, 7, 8:
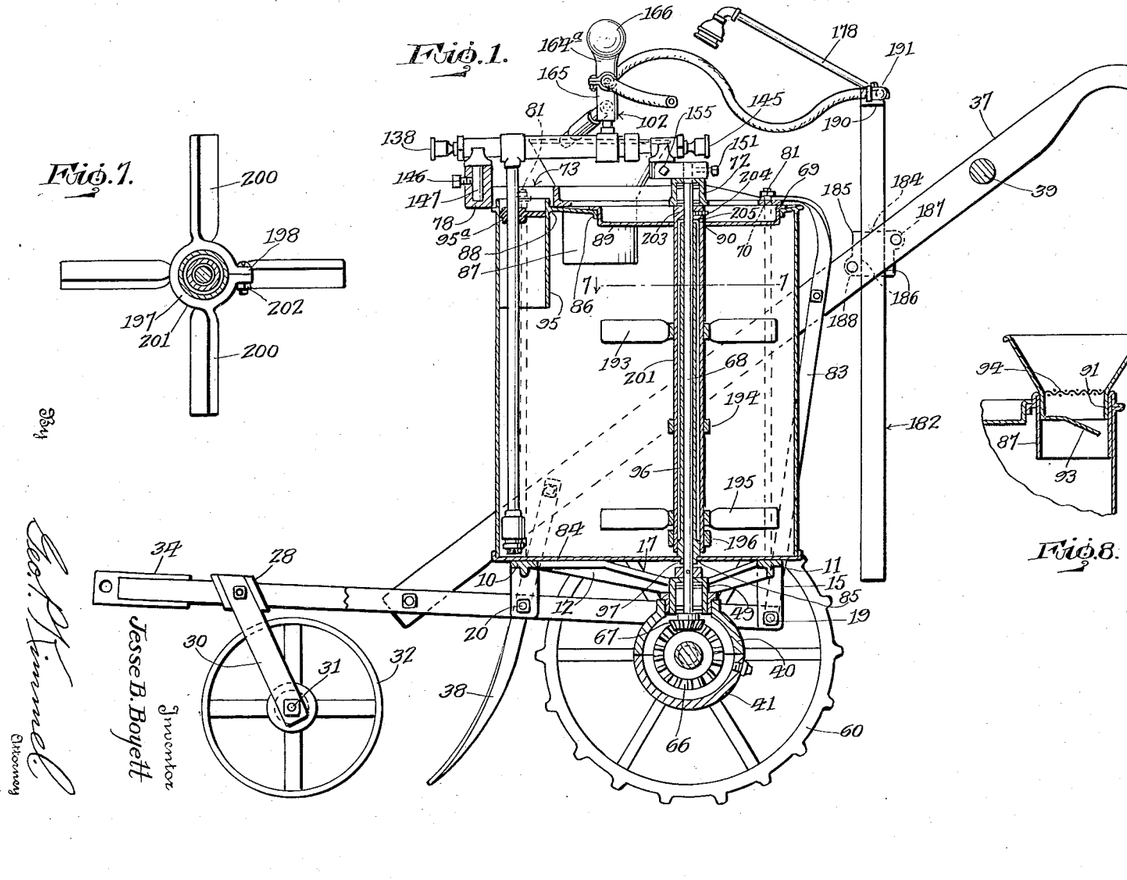
Figure 1 is a vertical sectional view of the machine.
Figure 7 is a section on line 7—7, Figure 1.
Figure 8 is a detail illustrating the filling open for the tank.

The machine includes a top frame formed of a straight rear bar 69 having an aperture 70 at each end thereof, an apertured central bar 71 integral at one end with bar 69 and formed intermediate its ends with a vertically disposed collar 72 and a front bar 73 integral with the bar 71. The bar 73 consists of a triangular shaped central portion 74 of skeleton form and a pair of oppositely disposed forwardly inclined flat end portions 75, 76 integral with the rear ends of the sides of said central portion. The base of said central portion is integral centrally with the forward end of the bar 71. The outer ends of the portions 75, 76 are apertured, as at 77. The apex of the portion 74 is provided with an upstanding socket forming member 78 (Figure 1).

The machine includes a tank 79 for the solution and constitutes a reservoir for the latter. The tank 79 is arranged between the top and bottom frames. The tank 79 seats against the bars 10, 11 and 12. The tank 79 is clamped stationary between the top and bottom frames by stay bolts 80 and nuts 81 at the upper and lower ends of said bolts. The bolts extend through the openings 70, 77 and openings 82 provided at the ends of bars 10 and 11. Bracing means 83 for the handle bars extend laterally from the rear bar 69 of the top frame. The top and bottom frames, in connection with the tank 79, provide a unitary supporting structure for a pump structure to be presently referred to.

The bottom 84 of tank 79 is provided with an eccentrically disposed opening 85. The top 85 of tank 79 is formed with an enlarged eccentrically disposed opening 86, a combined filling and return sleeve 87 (Figure 8) adjacent opening 86 and an opening 88 adjacent opening 87. The opening 88 is intersected by the horizontal diameter of top 85. Frictionally engaging with the edge of the opening 86 is a detachable flanged closure 89 formed with an axially arranged opening 90. The sleeve 87 extends above the upper face of top 85 of tank 79 and has frictionally engaging therewith the lower part 91 of an upstanding funnel 92. The latter has arranged therein a downwardly inclined baffle plate 93 to prevent the outward splashing of the solution within the tank, but it also permits the surplus solution to return to the tank. Within the funnel 92, in proximity to director 93, is arranged a filtering element 94. Secured intermediate its ends to the edge of opening 88 is a vertically disposed sleeve 95 of greater length than sleeve 87. The sleeves 87, 95 are open at each end. A resilient apertured member 95a is arranged within sleeve 95 to prevent the solution splashing outwardly from tank 79. Secured at its lower end in the opening 85 is a vertically disposed stationary stand-pipe 96 which extends from the bottom of tank 79 through opening 88 in closure 89. The lower end of pipe 96 is reduced, as at 97. The pipe 96, immediately above its lower end 97, has a part 98 of enlarged outer diameter with respect to that portion of pipe 96 above said part 98. The opening 88 receives the end part 97 and the latter is up set and, in connection with part 98, anchors pipe 96 to the bottom of tank 79. The pipe 96 prevents the solution from contacting with the pump operating shaft 68 and overcomes the necessity of employing a stuffing box at the bottom of the tank.

The pump structure, which is mounted in a manner to provide for the bodily oscillation thereof includes a pump body 99, a valve controlled suction pipe 100, a reciprocatory plunger 101 and an air chamber forming element 102. The pump body 99 consists of cylinder 103 open at each end, a hollow head 104 open at its rear, formed with an opening 105 in its bottom and an opening 106 in its top normally closed by a plug 107, an outwardly directed extension 108 at the front of the head 104 and a stuffing box element 110 secured to and extending rearwardly from the inner end of cylinder 103. The element 110 is formed with a portion 111 of enlarged inner diameter provided at its top with an upstanding tubular extension 112 which is internally threaded. The cylinder 103 extends into the inner side of head 104 and threadedly engages therewith. The head 104 has an integral internally threaded collar 113 at its bottom which communicates with opening 105. The inner diameter of the part 114 of stuffing box element 110 corresponds to that of the major portion of the length of the plunger 101.

The plunger 101 comprises a tubular member 115 which is open at each end and its body, in proximity to its forward end, is provided with a pair of diametrically opposed discharge outlets 116. The body of the member 115, at its forward end, is reduced, as at 117, to form the forward portion of member 115 of greater inner diameter than the remaining portion of said body. The outlets 116 are arranged in the reduced forward end 117 adjacent the forward end of member 115. The forward and rear ends of member 115 are internally threaded. The member 115 travels against the inner face of the part 114 of element 110. Extending into and threadedly engaging with the forward end of member 115 is the plunger head 118 consisting of a peripherally threaded cylindrical member 119 having its rear end constituting a valve seat 120 for a spring controlled check valve 121 arranged within member 115. The portion of enlarged inner diameter of member 115 provides a clearance for valve 121. The controlling spring 122 for valve 121 is arranged within member 115 and is interposed between valve 121 and an abutment 123 which is positioned in and bodily moves with member 115. Arranged upon member 119 is a pair of oppositely disposed spaced cup washers 124. A spacer 125 is arranged between washers 124. Threadedly engaging with member 119 is a pair of lock nuts 126, 127. The nut 126 locks the member 119 to member 115. The nuts 126, 127 lock the cup washers on member 119. The latter is formed with notches 128 to facilitate the screwing thereof into member 115. The nut 127 has notches 129 to facilitate the screwing thereof on member 119. The washers 124 travel against the inner face of cylinder 103. The rear end of member 115 is closed by the stem 130 which projects from the head 131 of a plug 132. The head 131 is formed with a spherical-shaped socket 133, a slot 134 in its top opening into socket 133, an opening 134a in its bottom leading from socket 133 and an annular socket 134b extending from the outer end of head 131 and communicating with socket 133. The wall of socket 133 is threaded. Threadedly engaging with the wall of socket 133 is a peripherally threaded tubular wear take-up element 135 having a beveled inner end 136. The element 135 is secured in position by a lock nut 137. Extending into the inner end of element 135, as well as being secured thereto is a lubricant cup 138. The extension 108 is provided intermediate its ends with a spherical shaped socket 139, a skeleton rectangular boss 140 on its top, a slot 141 opening into the boss and into socket 139, a slot 141a opening at the bottom of the extension and into socket 139 and a socket 142 opening into socket 139. The wall of socket 142 is threaded. Threadedly engaging with the wall of socket 142 is a peripherally threaded tubular wear take-up element 143 having a beveled inner end 144. The element 143 is secured in position by a lock nut 144a. Extending into the outer end of element 143, as well as being secured thereto, is a lubricant cup 145.

Mounted in the socket forming member 78, as well as being secured thereto by a set screw 146, is a vertically disposed post 147 having a reduced upper end part 148 and a spherical enlargement 149 from which the part 148 extends. The enlargement 147 is mounted in the socket 139. The part 148 extends through slot 141 into boss 140. The part 149a of post 147 extends downwardly through slot 141a. Interposed between extension 108 and socket forming member 78 is a grease retainer 150 through which extends part 149a of post 147. The extension 108 and post 147 coact to provide a universal joint supporting connection between the forward end of the pump structure and the tank.

The operating shaft 68 for the pump structure extends upwardly through stand-pipe 96 and through collar 72 and above bar 71. The upper end of shaft 68 has secured thereto by a set screw 151 a crank arm 152 formed with a vertical opening 153 into which the lower end of a vertically disposed shiftable post 154 is anchored to arm 152 by a set screw 155 whereby the post 154 will be bodily carried with arm 152. The post 154, at its upper end, has a reduced part 156. The post 154 is also provided with a spherical enlargement 157 from which part 156 extends upwardly. The enlargement 157 is arranged in socket 133. The part 156 extends into the slot 134. The part 158 of post 154 extends downwardly through opening 134ᵃ. Interposed between head 131 and arm 152 is a grease retainer 159 through which extends the part 158 of post 154. The retainer 159 is carried by crank arm 152. The plug 132 coacts with the post 154 to provide a universal joint supporting connection between the rear end of the pump structure and its operating means.

The universal joint supporting connections form a centering means for the pump plunger 101 with respect to the pump body and the latter with respect to the plunger during the oscillatory movement of the pump structure simultaneously with the reciprocatory movement of the plunger. The universal joint supporting connections also eliminate the employment of connecting rods for the pump structure, as well as eliminate excessive wear and side strain on the plunger during the reciprocation of the latter. The adjustable wear take-up elements compensate for wear of the spherical enlargements of the posts and the walls of the sockets in which said enlargements are seated.

The suction pipe 100 includes a rigid upstanding tubular pipe member 160 open at and provided with peripheral threads at each end. The upper end of member 160 is secured to collar 113. The lower end of member 160 communicates with and is connected to the housing 161 of a spring controlled metallic reinforced resilient check valve 162 to prevent the solution from running back into the tank on the expelling stroke of the plunger. Secured to the lower end of and depending from housing 161 is a strainer element 163 having its upper end 164 providing a seat for valve 162. The pipe member 160 extends through the resilient member 96.

The air chamber forming element 102 consists of an upstanding body 164ᵃ having a tubular part 165 which opens at its upper end in a hollow spherical enlargement 166. The part 165 and enlargement 166 provide the air chamber 167. The part 165 is open at its lower end and has connected to such end a tubular nipple 168 which is connected to and opens into the tubular extension 112 of element 110. The part 165 is formed with a pair of oppositely extending collars 169, 170 which endwise align and are internally threaded. Engaging with the collars 169, 170 are peripherally threaded rigid nipples 171, 172 respectively to which are clamped, as at 173, the inner ends of oppositely extending flexible solution supply lines 174, 175 having elbows 176, 177 respectively connected to their outer ends. Attached to the elbows 176, 177 are adjustable rigid spray lines 178, 179 respectively of angle form. Adjustably connected to the outer ends of the lines 178, 179 are nozzles 180, 181 respectively.

The spray lines are adjustably supported and for this purpose a pair of upstanding supports 182, 183 are provided for the lines 178, 179 respectively. The supports 182, 183 are adjustably connected, as at 184, to the handle bars of the machine, and the connections 184 are such that the line supports can be latched in their vertically adjusted positions. Each of the connections 184 consists of a plate 185 grooved in its inner face, as at 186, for the passage of a line support. The plate 185 has laterally disposed apertured lugs 187 for the passage of bolts 188 carried by a handle bar. Clamping nuts 189 are mounted on the outer end of bolts 188. When the nuts 189 are loosened the line supports may be elevated or lowered for adjustment. After adjustment, the nuts 189 are screwed home whereby the plates 185 clamp the line supports to the handle bars. Each line support is provided, at its upper end, with an outwardly directed flange 190 upon which is arranged a segmental shaped clamp 191. The spray lines are positioned in the flanges 190 and may be adjusted for different widths of rows and disposed at any desirable inclination, and after adjustment they are clamped to flanges 190 by clamping bolts 192 extending through clamps 191 and flanges 190.

The machine includes a plurality of spaced superposed sets 193, 194, 195 and 196 of radially disposed agitators and with the sets simultaneously operated. Each set of agitators consists of a split band 197 formed with a pair of opposed outwardly directed flanges 198 flush with the edges at the split of the band. Integral with the band 199 is a pair of diametrically opposed blades 200 disposed at an angle of approximately forty-five degrees throughout their length. The blades of an upper set are staggered with respect to the blades of a lower set. The bands 199 are clamped to and encompass a tubular operating shaft 201. The flanges of each band are provided with aligning openings through which extend holdfast means 202 for clamping the band to shaft 201. The sets 193, 194, 195 of the blades are spaced approximately equi-distance in superposed relation. The band 199 of the set 195 is arranged in superimposed relation with respect to the band 199 of the set 196. The lower end of shaft 201 revolves about the enlarged part 98 of the stand-pipe 96. The upper end of shaft 201 extends upwardly through the opening 90 in closure 89. The upper end of shaft 201 is formed with an inwardly arranged annular flange 203 through which extends the shaft 68. The shaft 201 is secured to shaft 68 so as to bodily rotate therewith by a binding screw 204. The flange 203 is arranged over and in close proximity to the upper end of stand-pipe 96. The shaft 201 directly below flange 203 is provided with a vent part 205 to prevent a vacuum being formed between shaft 201 and stand-pipe 96. On the travel of the machine in either direction the shafts 68 and 201 will be operated in unison. The sets of agitators 195, 196 give quick agitation to the lower portion of the solution on the starting of the machine and keep the strainer 163 clean whereby the supply of solution is not retarded during the operation of the machine.

The part 165 of the body 164 of the air chamber forming element 162 is formed with solution outlet ports 206, 207 having their walls registering with the inner faces of the collars 169, 170. The part 165 below port 207 is formed with a solution return port 208 having its wall registering with the inner face of an internally threaded collar 209 formed on the periphery of part 165. Engaging with the collar 209 and extending outwardly therefrom is a rigid nipple 210 secured to a downwardly curved rigid pipe branch 211 which is secured at its lower end into the upper end of a downwardly inclined valve housing 212. The lower end of branch 211 constitutes a seat for a spring controlled regulating valve 213 arranged in housing 212. Extending downwardly from the lower end of housing 212 is an adjustable nipple 214 constituting a tensioning means for the controlling spring 215 for the valve 213. The spring 215 is interposed between valve 213 and the inner end of nipple 214. The valve 213 acts as a regulator to govern the amount of the solution to be sprayed on the plant and further controls the surplus solution on returning to the tank. The nipple 214 discharges into the funnel. The tension of the spring 215 controls the opening and closing of valve 213. The lighter the tension of spring 215 the smaller the application of solution to the plant and the greater the return of surplus solution to the tank.

The plug 107 constitutes a priming means for the spraying solution.

On the suction stroke of the plunger, the valve 121 is closed and the solution is drawn into the intake end of cylinder 103 and also into the head 118. The solution drawn into the cylinder on the suction stroke of the plunger is shut off from the air chamber by the cup washers and the closed position of valve 121. On the expelling stroke of the plunger the solution passes through head 118, unseats valve 121 and passes through outlets 116 to the air chamber and is discharged from the latter. The valve 162 is closed on the suction stroke of the plunger but is opened on the expelling stroke of the latter. After the initial operation of the plunger there will always be at the rear of the cup washers a body of solution to provide for a continuous discharge on the operation of the machine.

What I claim is:

1. In a spraying machine, a tank constituting a spraying solution reservoir, an oscillatory pump structure arranged above the tank and including a valve controlled suction pipe depending into the tank, a pump body and a reciprocatory plunger operating in said body, said structure having an air chamber for receiving solution from the reservoir on the operation of said plunger, means connected to said plunger for bodily oscillating said structure and for simultaneously operating said plunger during the oscillatory movement of the structure, said means extending through said tank, spray lines for the solution communicating with said air chamber, and means supported from the tank and from said operating means and connected to the pump body and plunger to provide for the centering of the plunger relative to said pump body during the operation of the plunger and the oscillation of said structure.

2. In a spraying machine, a tank constituting a spraying solution reservoir, an oscillatory pump structure arranged above the tank and including a valve controlled suction pipe depending into the tank a pump body and a reciprocatory plunger operating in said body, said structure having an air chamber for receiving solution from the reservoir on the operation of said plunger, means connected to said plunger for bodily oscillating said structure and for simultaneously operating said plunger during the oscillatory movement of the structure, said means extending through said tank, spray lines for the solution communicating with said air chamber, means supported from the tank and from said operating means and connected to the pump body and plunger to provide for the centering of the plunger relative to said pump body during the operation of the plunger and the oscillation of said structure, and regulating means opening into the air chamber and discharging into the tank for controlling the quantity of the solution sprayed.

3. In a mobile spraying machine, a unitary structure including a tank constituting a reservoir for the spraying solution, traction wheels supporting said structure, a pump structure arranged over said unitary structure and including a valve controlled suction pipe depending into said reservoir, an air chamber for receiving the solution and valve controlled means for establishing communication between said chamber and pipe, an operating shaft for the pump structure extending through the tank, driving means for said shaft operated from said traction wheels, sets of agitators within the tank, an operating shaft for the agitators arranged concentrically, connected to and driven from the operating shaft for the pump structure, and spray lines for the solution communicating with the air chamber.

4. In a mobile spraying machine, a unitary structure including a tank constituting a reservoir for the spraying solution, traction wheels supporting said structure, a bodily oscillatory pump structure arranged over said unitary structure and including a valve controlled suction pipe depending into said reservoir, an air chamber for receiving the solution and valve controlled means for establishing communication between said chamber and pipe, a shaft for bodily oscillating the pump structure and for operating the latter during the oscillatory movement of the pump structure, said shaft extending through the tank, driving means for said shaft operated from said traction wheels, sets of agitators within the tank, an operating shaft for the agitators arranged concentrically, connected to and driven from the operating shaft for the pump structure, spray lines for the solution communicating with the air chamber, and regulating means opening into the air chamber and discharging into the tank for controlling the quantity of the solution sprayed.

5. In a mobile spraying machine, a unitary structure including a tank constituting a reservoir for the spraying solution, traction wheels supporting said structure, an oscillatory pump structure arranged over said unitary structure and including a valve controlled suction pipe depending into said reservoir, a pump body, a reciprocatory plunger operating in said body, an air chamber for receiving the solution and valve controlled means for establishing communication between said chamber and pipe, a shaft for bodily oscillating said structure and for reciprocating the plunger during the oscillatory movement of said structure, said shaft extending through the tank, driving means for said shaft operated from said traction wheels, sets of agitators within the tank, an operating shaft for the agitators arranged concentrically, connected to and driven from the operating shaft for the plunger, spray lines for the solution communicating with the air chamber, regulating means opening into the air chamber, and discharging into the tank for controlling the quantity of the solution sprayed, and means supported from the tank and from said shaft and connected to the pump body and plunger to provide for the centering of the plunger relative 6. In a mobile spraying machine, a unitary structure including a tank constituting a reservoir for the spraying solution, traction wheels supporting said structure, an oscillatory pump structure arranged over said unitary structure and including a valve controlled suction pipe depending into said reservoir, a pump body, a reciprocatory plunger operating in said body, an air chamber for receiving the solution and valve controlled means for establishing communication between said chamber and pipe, a shaft for bodily oscillating said structure and for reciprocating the plunger during the oscillatory movement of said structure, said shaft extending through the tank, driving means for said shaft operated from said traction wheels, sets of agitators within the tank, an operating shaft for the agitators arranged concentrically, connected to and driven from the operating shaft for the pump structure, spray lines for the solution communicating with the air chamber, and means supported from the tank and from said operating shaft for the plunger and connected to the pump body and plunger to provide for the centering of the plunger relative to the pump body during the operation of the plunger and the oscillation of the pump structure.

7. In a spraying machine, a solution containing tank, bodily oscillatory pump structure for spraying the solution, said structure including a pair of interengaging elements slidable relatively to each other, said structure arranged over and communicating with the tank, operating means for the pump structure and for reciprocating said elements relative to each other, and spaced means extending above the tank, connected to said elements and supporting said structure and having coacting parts for centering said elements relatively to each other during the reciprocation of one of said elements and the oscillation of said structure.

8. In a spraying machine, a solution containing tank, a bodily oscillatory pump structure for spraying the solution, said structure arranged over and communicating with the tank and including a pump body and a reciprocatory plunger operating in said body, means for bodily oscillating and operating the pump structure extending through the tank, means carried by the tank and said operating means, connected to said body and plunger and having coacting parts for centering said plunger relative to said body during the operation of the plunger and oscillation of the pump structure, agitators within the tank, and operating means for the agitators, arranged concentrically with respect to and connected to the operating means for said structure, the operating means for the agitators being driven by and in unison with the operating means for said structure.

9. In a spraying machine of that type including a solution containing tank, a pump structure for spraying the solution and agitators for the solution, the combination of an operating shaft for the pump structure extending through the tank, a stand-pipe fixed to the tank and encompassing said operating shaft, the upper end of said stand-pipe being positioned in proximity to the upper end of the operating shaft, an operating shaft for and carrying the agitators, arranged concentrically to said other shaft and stand-pipe, connected to and operated from the said shaft, extending above the top of the tank and having a vent port near its upper end.

10. In a spraying machine, a solution containing tank, a bodily oscillatory pump structure for spraying the solution and including a reciprocatory plunger, said structure arranged over and communicating with the tank, operating means for said plunger and for bodily oscillating the pump structure, spaced means extending above the tank, connected to and supporting said structure and having coacting parts for centering said plunger during its operation simultaneously with the bodily oscillation of said structure, and regulating means opening into the pump structure and discharging into the tank for controlling the quantity of the solution sprayed.

11. In a mobile spraying machine of that type including a solution containing tank, a rigid lower supporting frame for the tank including a front, a rear, a central and a pair of side bars, said front and rear bars being formed with depending hangers anchored to the side bars, a gear housing, bearings clamped to and extending from the housing, means for anchoring the bearings to said side bars, and an axle extending through the housing and bearings and provided with traction wheels.

12. In a mobile spraying machine of that type including a solution containing tank, a rigid lower supporting frame for the tank including a front, a rear, a central and a pair of side bars, said front and rear bars being formed with depending hangers anchored to the side bars, a gear housing, bearings clamped to and extending from the housing, means for anchoring the bearings to said side bars, an axle extending through the housing and bearings and provided with traction wheels, a rigid upper frame, and means for coupling said frames together for clamping the tank therebetween.

13. In a mobile spraying machine of that type including a solution containing tank, a rigid lower supporting frame for the tank including a front, a rear, a central and a pair of side bars, said front and rear bars being formed with depending hangers anchored to the side bars, a gear housing, bearings clamped to and extending from the housing, means for anchoring the bearings to said side bars, an axle extending through the housing and bearings and provided with traction wheels, a rigid upper frame, means for coupling said frames together for clamping the tank therebetween, said side bars extending forwardly from said front bar, a caster wheel supported from the side bars, and handle bars anchored to said side bars.

14. In a spraying machine, a tank constituting a spraying solution reservoir, a horizontally disposed reciprocatory pump structure arranged over and including a valved suction pipe at one end thereof depending into said reservoir and an air chamber for receiving solution to be sprayed from said reservoir on the operation of said structure, said structure and tank having coacting means for pivotally supporting the said end of the pump structure and for spacing the latter from the tank, and rotatable means for simultaneously operating and bodily oscillating said structure, said structure and rotatable means having coacting parts for supporting the other end of said structure and for spacing the latter from said tank.

15. In a spraying machine, a tank constituting a spraying solution reservoir, a horizontally disposed reciprocatory pump structure arranged over and including a valved suction pipe at one end thereof depending into said reservoir and an air chamber for receiving solution to be sprayed from said reservoir on the operation of said structure, said structure and tank having coacting means for pivotally supporting the said end of the pump structure and for spacing the latter from the tank, rotatable means for simultaneously operating and bodily oscillating said structure, said structure and rotatable means having coacting parts for supporting the other end of said structure and for spacing the latter from said tank, spray lines for the solution having flexible parts connected to the walls of and opening into said chamber, and controllable regulating means having a flexible part connected to a wall of and opening into said air chamber, said regulating means discharging into the tank for controlling the quantity of solution sprayed.

16. A mobile spraying machine comprising a supporting structure including traction means, a solution containing tank anchored upon said structure, a bodily oscillatory horizontally disposed reciprocating pump arranged over and having a valve controlled intake depending into the tank, a vertically disposed air chamber forming element opening at its lower end into and anchored to the top of the pump intermediate the ends of the latter, means driven from said traction means and extending through the tank for simultaneously bodily oscillating and operating the pump, a pair of vertically adjustable supports connected to said structure, flexible spraying solution supply lines connected to said element, a pair of rigid angle-shaped spray lines, each adjustably connected intermediate its ends to the upper end of a support, said spray lines connected at their inner ends to the outer ends of said supply lines, and adjustable nozzles connected to the outer ends of said spray lines.

17. In a mobile spraying machine, a supporting structure including traction means and a pair of rearwardly extending handle bars, a solution containing tank clamped to said structure, a pump arranged over and communicating with said tank, operated from said traction means and including a vertically disposed air chamber, vertically adjustable supports adjustably connected to said handle bars rearwardly of the tank, flexible solution supply lines opening into said air chamber, and angle-shaped rigid adjustable spray lines adjustably connected intermediate their ends to the upper ends of said supports, provided with nozzles at their outer ends and connected at their inner ends to said supply lines.

JESSE B. BOYETT.